F. H. HALSTEAD.
HYDRAULIC BRAKE.
APPLICATION FILED AUG. 31, 1909.
944,429.
Patented Dec. 28, 1909.
2 SHEETS—SHEET 1.
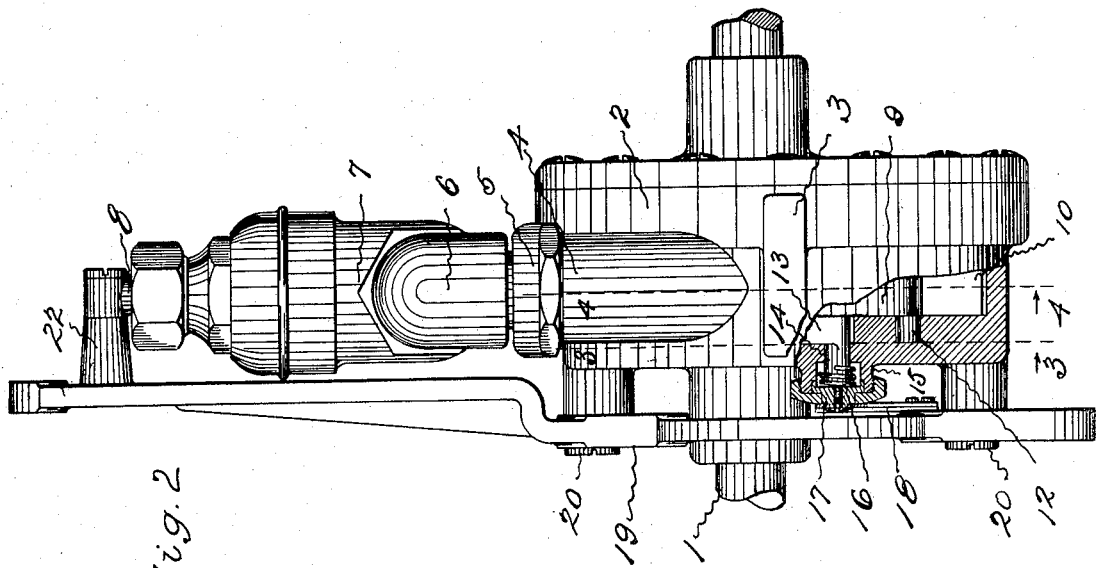
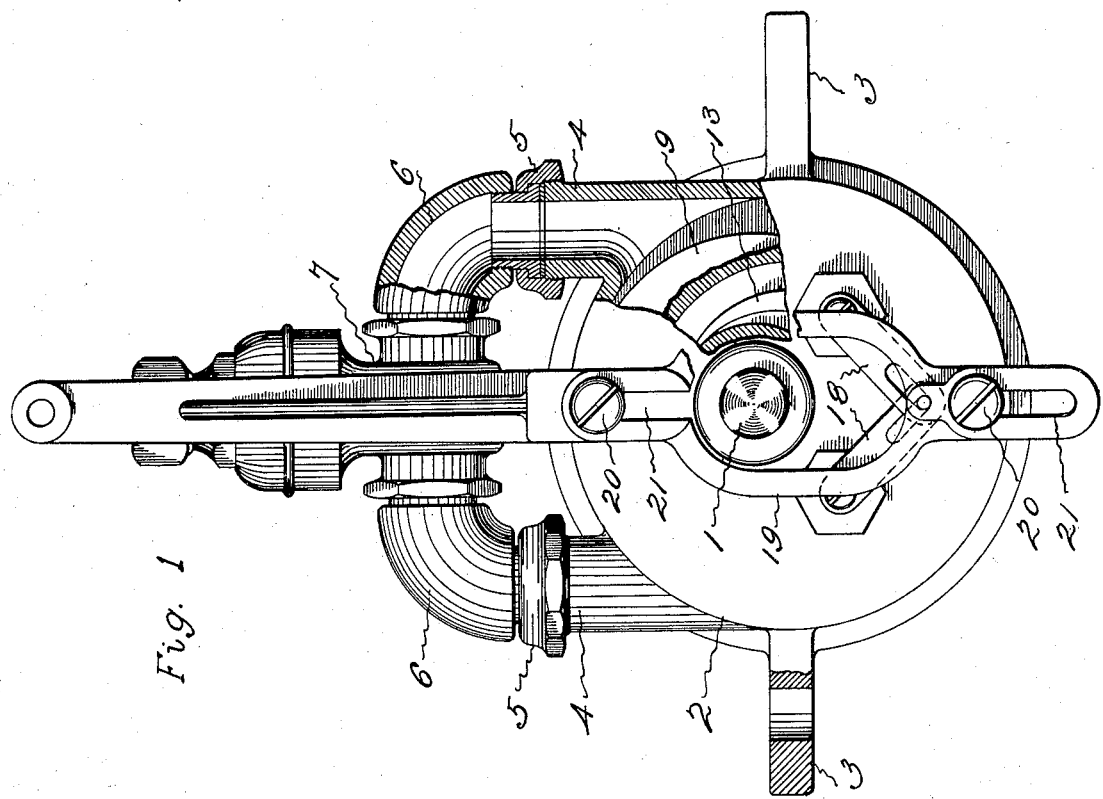
Witnesses:
Inventor:
Frederick N. Halstead
by
Harry P. Williams, atty.

UNITED STATES PATENT OFFICE.

FREDERICK H. HALSTEAD, OF PITTSFIELD, MASSACHUSETTS.

HYDRAULIC BRAKE.

944,429.  Specification of Letters Patent.  Patented Dec. 28, 1909.

Application filed August 31, 1909. Serial No. 515,416.

*To all whom it may concern:*

Be it known that I, FREDERICK H. HALSTEAD, a citizen of the United States, residing at Pittsfield, in the county of Berkshire and State of Massachusetts, have invented a new and useful Improvement in Hydraulic Brakes, of which the following is a specification.

This invention relates to that class of brakes which are designed to vary the speed of, or stop the rotation of a driven part, such as the axle of a car, automobile, or like vehicle, or the shaft of an engine, motor, dynamo or similar machine, or a line of shafting in a shop or mill, by controlling the flow of, or stoppage of flow of, liquids, such as oil, or semi-liquids, such as grease or non-fluid oil, pumped by the rotation of the driven part.

The object of the invention is to provide a simple and efficient brake of this character which is so constructed that the rotation of the driven part, shaft or axle, can be retarded to the desired degree, or completely stopped, as slowly or as quickly as necessary, in a smooth and noiseless manner, and which has its pump pistons so controlled, by mechanism connected with the stop valve that controls the liquid passage, that the liquid is quiescent when the parts are running normally and are not being used to effect any braking or retarding action, thus eliminating fluid friction and heating and reducing the expenditure of energy.

Figure 3:
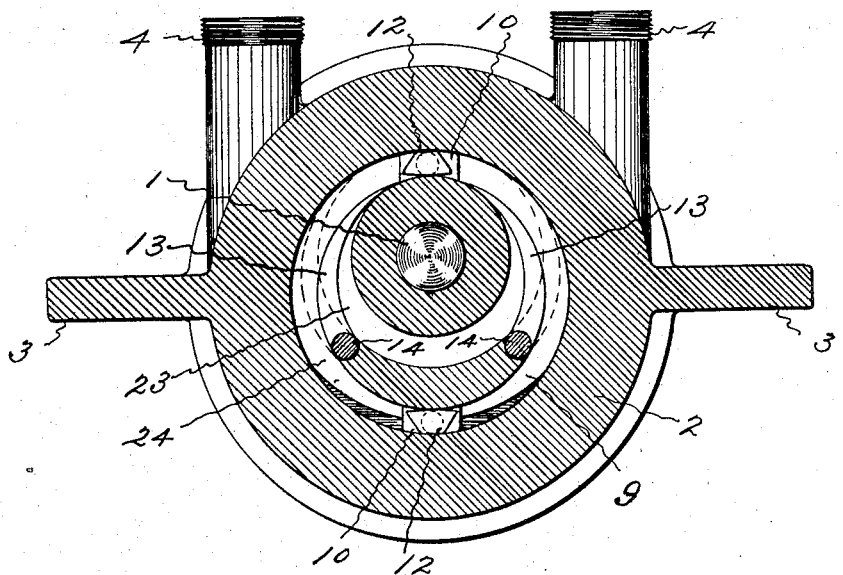
Figure 4:
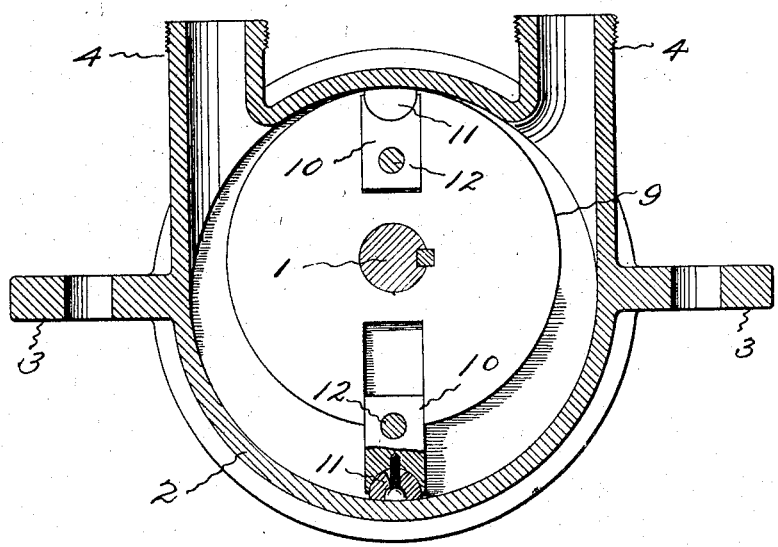

Figure 1 of the accompanying drawings shows a front elevation, with part broken away, of a hydraulic braking apparatus which embodies this invention. Fig. 2 shows a side elevation of the same. Fig. 3 shows a vertical section on the plane indicated by the dotted line 3—3 on Fig. 2. Fig. 4 shows a vertical section through the casing on the plane denoted by the dotted line 4—4 on Fig. 2.

The driven shaft or axle 1 which is to be braked, or which may be connected with the part to be controlled by the apparatus illustrated, extends through a liquid tight cylindrical casing 2. The casing shown has flanges 3 by means of which it may be secured in position. Projecting tangentially from the top edge of the casing are two threaded hubs 4. These hubs, by couplings 5 and elbows 6, are connected with the opposite sides of a stop valve 7. This valve is of common construction and its gate is raised and lowered to open and close the fluid way, by means of the stem 8 in the usual way.

Keyed upon the shaft in the chamber of the casing is a disk 9. The disk is circular and is mounted with its center coincident with the center of the shaft, while the axes of the shaft and disk are located eccentric with the center of the cylindrical chamber in the casing. Movable radially in mortises in the periphery of the disk are piston blocks 10. At the outer ends these pistons have shoes 11 which are fitted to the peripheral wall of the chamber. Studs 12 project laterally from one side of the pistons.

In a recess in the face of the casing at one side of the circular piston chamber, are a pair of curved switch fingers 13. The outer walls of the fingers are formed on the arc of a circle the center of which is coincident with the center of the circular piston chamber in the casing, and the inner walls of the fingers are formed on the arc of a circle, the center of which is coincident with the center of the piston disk. At the larger ends these fingers are pivotally retained in place by laterally extending stems 14. Each stem, in a gland 15, is connected by a spring 16 with a block 17 that is secured to the end of a lever 18. These levers are connected by pin and slot joints with a yoke 19 that is movably fastened to one face of the casing by screws 20 that extend through slots 21 in the yoke. The valve stem is connected with the yoke by means of the arm 22. The end of the yoke is designed to be connected with the lever or rod by means of which the device is operated.

If the valve is open there is a free passage through it from one side of the casing to the other, and if the valve is closed liquid cannot flow through it from one side of the casing to the other. The valve is opened and closed by the movement of the yoke bar which is connected with the valve stem. The movement of the yoke, through the levers 18, and springs 16 swings the switch fingers. The parts are so designed that the switch fingers are swung when the valve starts to move, the spring connections yielding, after the fingers are swung, to permit further movement of the valve.

When the valve is opened the fingers are swung to the positions illustrated by the dotted lines in Fig. 3, then, the studs 12, that project from the piston blocks, are guided by the fingers so as to travel in the circular groove 23, and the center of this groove being coincident with the axis of the piston disk the piston blocks are held retracted in the disk, and consequently do not work, that is, pump no liquid and exert no retarding or braking action as the disk rotates. When the valve is closed or partly closed the fingers are swung to the positions illustrated by the full lines in Fig. 3, then the studs 12 are guided so as to travel in the groove 24. As the center of this groove is coincident with the center of the piston chamber and eccentric with the center of the disk the pistons are caused to travel with their shoes in contact with the wall of the chamber, as shown in Fig. 4. Under these conditions the rotation of the disk causes the pistons to pump liquid or semi-liquid matter, with which the casing is filled, from one side to the other, and if the flow of liquid is restricted or stopped by the valve the rotation of the disk is retarded or entirely stopped. As the pistons are held retracted when the valve is open they do no work, allowing the liquid to remain quiescent as the disk is rotated when no braking action is required. This eliminates friction and heating of the liquid when the driven shaft is running free and consequently economizes power. However, as soon as the valve commences to close the switch fingers are swung so as to guide the pistons out, then they begin to pump liquid and retard the rotation of the driven shaft.

The invention claimed is:

1. An apparatus for retarding or stopping a rotating part, having a casing with a cylindrical chamber and a passage from one side of the chamber to the other, a stop valve arranged to control the flow of liquid through said passage, a shaft extending through the casing eccentrically with respect to the chamber, a disk mounted centrally on the shaft, pistons movable in the periphery of the said disk, switch fingers movable in the casing for guiding the pistons, and means for throwing the said fingers.

2. An apparatus for retarding or stopping a rotating part, having a casing with a cylindrical chamber and a passage from one side of the chamber to the other, a stop valve arranged to control the flow of liquid through said passage, a shaft extending through the casing eccentrically with respect to the chamber, a disk mounted centrally on the shaft, pistons movable in the periphery of said disk, switch fingers movable in the casing for guiding the pistons, and means connected with the valve and with the switch fingers whereby the movement of said means moves the valve and fingers simultaneously.

3. An apparatus for retarding or stopping a rotating part, having a casing with a cylindrical chamber and a passage from one side of the chamber to the other, a stop valve arranged to control the flow of liquid through said passage, a shaft extending through the casing eccentrically with respect to the chamber, a disk mounted centrally on the shaft, pistons movable in the periphery of said disk, switch fingers movable in the casing for guiding the pistons, levers connected with the fingers, a yoke movable on one face of the casing, and means connecting the yoke and the valve and the yoke and the switch levers.

4. An apparatus for retarding or stopping a rotating part, having a casing with a cylindrical chamber and a tangential inlet on one side and a tangential outlet on the other side, a stop valve, fittings connecting said valve with the casing inlet and outlet, a shaft extending through the casing eccentrically with respect to the chamber, a disk mounted centrally on the shaft, pistons movable in the periphery of the disk, means for guiding the pistons, and means connected with said guiding means and with the valve whereby they are moved coincidently.

5. An apparatus for retarding or stopping a rotating part, having a casing with a cylindrical chamber and a passage from one side of the chamber to the other, a stop valve arranged to control the flow of the liquid through said passage, a shaft extending through the casing eccentrically with respect to the chamber, a disk mounted centrally on the shaft, pistons movable in the periphery of the disk, switch fingers movable in the casing for guiding the pistons, a yoke movable on one face of the casing and connected with the valve, levers connected with the yoke, and springs connecting the levers with the switch fingers.

6. An apparatus for retarding or stopping a rotating part, having a casing with a cylindrical chamber and a passage from one side of the chamber to the other, a stop valve arranged to control the flow of the liquid through said passage, a shaft extending through the casing eccentrically with respect to the chamber, a disk mounted centrally on the shaft, piston blocks movable radially in the disk, bearing shoes mounted in the ends of said blocks, switch fingers movable in the casing for guiding the pistons, and means for throwing the said fingers.

FREDERICK H. HALSTEAD.

Witnesses:
A. W. NICOLL, Jr.,
H. D. LARAWAY.